United States Patent
Nicholson

(10) Patent No.: US 9,431,788 B2
(45) Date of Patent: Aug. 30, 2016

(54) MODE CONVERTER FOR HIGH POWER, HIGHER-ORDER MODE OPTICAL FIBER AMPLIFIERS

(71) Applicant: OFS FITEL, LLC, Norcross, GA (US)

(72) Inventor: Jeffrey W Nicholson, Warren, NJ (US)

(73) Assignee: OFS FITEL, LLC, Norcross, GA (US)

( * ) Notice: Subject to any disclaimer, the term of this patent is extended or adjusted under 35 U.S.C. 154(b) by 0 days.

(21) Appl. No.: 14/670,831

(22) Filed: Mar. 27, 2015

(65) Prior Publication Data
US 2015/0340830 A1    Nov. 26, 2015

Related U.S. Application Data

(60) Provisional application No. 61/982,016, filed on Apr. 21, 2014.

(51) Int. Cl.
| | |
|---|---|
| G02B 6/26 | (2006.01) |
| G02B 5/18 | (2006.01) |
| G02B 6/02 | (2006.01) |
| H01S 3/067 | (2006.01) |
| G02B 27/46 | (2006.01) |
| H01S 3/091 | (2006.01) |
| G02B 6/32 | (2006.01) |
| G02B 6/34 | (2006.01) |
| G02B 27/00 | (2006.01) |
| G02B 6/14 | (2006.01) |

(52) U.S. Cl.
CPC .......... *H01S 3/06754* (2013.01); *G02B 6/262* (2013.01); *G02B 6/268* (2013.01); *G02B 6/32* (2013.01); *G02B 6/34* (2013.01); *G02B 27/0012* (2013.01); *G02B 27/46* (2013.01); *H01S 3/06708* (2013.01); *H01S 3/091* (2013.01); *G02B 6/14* (2013.01)

(58) Field of Classification Search
CPC . G02B 6/262; G02B 6/02023; G02B 5/1814
See application file for complete search history.

(56) References Cited

U.S. PATENT DOCUMENTS

| | | | |
|---|---|---|---|
| 5,058,981 A * | 10/1991 | Umegaki | G02B 27/42 359/328 |
| 7,228,029 B1 * | 6/2007 | Ramachandran | G02B 6/02019 372/6 |
| 7,340,138 B1 | 3/2008 | Yablon et al. | |
| 7,672,552 B2 | 3/2010 | Leuchs et al. | |
| 8,218,928 B2 | 7/2012 | Jasapara | |
| 8,358,888 B2 | 1/2013 | Ramachandran | |

(Continued)

OTHER PUBLICATIONS

Lindlein et al. "Achieving Gaussian outputs from large-mode-area higher-order-mode fibers", Applied Optics, vol. 46, No. 22, pp. 5147-5157 (2007).*

*Primary Examiner* — Eric Bolda
(74) *Attorney, Agent, or Firm* — Wendy W. Koba, Esq.

(57) ABSTRACT

A mode converter for use with a higher-order mode (HOM)-based fiber amplifiers takes the form of axicon-based configuration that is able to convert high power (tens of mW and higher) optical signals propagating in higher-order mode form into a diffraction-limited beam without experiencing the nonlinear effects (such as self-phase modulation) that are found when using a long-period grating (LPG) to create a diffraction-limited beam by performing mode conversion. The axicon may comprise a bulk optic device, a fiber-based device, or a GRIN-based configuration (where the refractive index profile of the GRIN element is formed to create a diffraction-limited signal).

26 Claims, 11 Drawing Sheets

(56) References Cited

U.S. PATENT DOCUMENTS

| | | |
|---|---|---|
| 8,507,877 B2 | 8/2013 | Nicholson et al. |
| 2004/0109164 A1* | 6/2004 | Horii ............... G01B 9/0201 356/479 |
| 2005/0069256 A1* | 3/2005 | Jennings ............ B24B 19/226 385/33 |
| 2006/0177182 A1* | 8/2006 | Mine ................. G02B 6/382 385/74 |
| 2007/0140634 A1 | 6/2007 | Windeler et al. |
| 2009/0257711 A1* | 10/2009 | Ramachandran .. G02B 6/02047 385/28 |
| 2015/0253240 A1* | 9/2015 | Rowe ............... G01B 9/02044 356/451 |

* cited by examiner

MODE CONVERTER FOR HIGH POWER, HIGHER-ORDER MODE OPTICAL FIBER AMPLIFIERS

CROSS-REFERENCE TO RELATED APPLICATIONS

This application claims the benefit of U.S. Provisional Application Ser. No. 61/982,016, filed Apr. 21, 2014 and herein incorporated by reference in its entirety.

TECHNICAL FIELD

The present invention relates to mode converters for use in fiber-based optical amplifiers and, more particularly, to mode converters for use with high power signals (e.g., powers greater than tens of kW).

BACKGROUND OF THE INVENTION

Ultra-large area higher-order mode (HOM) fiber amplifiers have been successfully demonstrated. For example, by operating in the $LP_{0,N}$ mode of a specially-designed multimode fiber, amplifiers with effective areas ($A_{eff}$) of 6000 $\mu m^2$ have been tested and shown to be suitable for high peak power pulse generation (e.g., peak power on the order of tens to hundreds of kW).

HOM fiber is known in the art and is generally comprised of optical fiber having a small inner core that guides the fundamental $LP_{01}$ mode (and facilitates splicing the HOM fiber to conventional single mode fiber) and a larger outer core that guides the desired higher-order mode. Long-period gratings (LPGs) have been used to in conjunction with HOM fiber to shift an incoming signal propagating within a core region of a conventional fiber into the outer core region of the HOM fiber; that is, converting the mode of the incoming signal from the fundamental $LP_{01}$ mode to a higher-order, selected $LP_{0,N}$ mode. This configuration has been found useful in the formation of doped fiber amplifiers, where a section of HOM fiber is fabricated to include a selected rare-earth dopant, and then used to perform optical amplification on the higher-order mode form of the propagating optical signal.

Since an amplified signal beam with a low $M^2$ value is typically required (where $M^2$ is a well-known beam quality measure that describes the deviation of the propagating beam from a theoretical Gaussian beam; in applications such as those of the present invention where the goal is to create a diffraction-limited beam, a value of $M^2$ as close to unity as possible is therefore desired), conversion of the amplified higher-order mode signal into its fundamental mode is typically used to create the desired diffraction-limited output beam. A second LPG is typically used to provide this mode re-conversion at the output of the HOM fiber amplifier.

While an output LPG for mode re-conversion is convenient, at high peak power (e.g., tens to a few hundred kW), a conventional fiber-based LPG device has been found to exhibit nonlinearities in the form of self-phase modulation in the presence of high power signals. These nonlinearities alter the mode conversion properties of an LPG in an unwanted fashion. At even higher peak powers (e.g., hundreds of kW to MW), permanent changes in the physical properties of LPGs have been observed. These nonlinear effects thus significantly impact the ability to generate the required diffraction-limited beams at the output of high peak power HOM amplifiers.

While these undesirable nonlinear effects can be somewhat mitigated by carefully controlling the design and properties of the HOM fiber and LPGs, it is not always practical to do so. For example, the fundamental mode area (i.e., the inner core) of the HOM fiber can be made larger, and/or the LPG can be made stronger and shorter (or possibly chirped). However, imposing the condition that the output beam must be spatially compressed into the small effective area fundamental mode of an LPG will ultimately lower the peak power-handling capability of an HOM amplifier when compared to an amplifier that does not require this spatial compression.

For at least these reasons, alternative mode conversion strategies that do not require re-entering small effective area fundamental mode are sought after for high peak power amplifiers.

SUMMARY OF THE INVENTION

The present invention relates to mode converters for use in fiber-based optical amplifiers and, more particularly, to axicon-based mode converters useful with high power signals (e.g., greater than tens of kW) to create diffraction-limited (low $M^2$) amplified output signals.

In accordance with the present invention, an axicon-based configuration is disposed at the output of a section of doped HOM fiber and used to convert the propagating higher-order mode signal (for example, the $Lp_{0,N}$ mode) into a diffraction-limited signal. An axicon is defined as an optical lens that includes a conical end section, where the axicon can be used to transform a Gaussian beam into an approximation to a Bessel beam. The apex angle $\alpha$ of the conical end section is used, in junction with the known mode order N of a propagating $LP_{0,N}$ signal, to create an arrangement that will convert a high power $LP_{0,N}$ mode optical signal into a diffraction-limited signal. The axicon-based configuration includes lens elements and spatial filtering to provide the best conversion quality output signal, in terms of $M^2$ value (on the order of unity for an ideal configuration) with highest possible efficiency.

In one embodiment of the present invention, bulk optic components are used for the lenses and axicon element, where their relative placements (and spacings) with respect to the higher-order mode amplified output from an HOM fiber are adjusted to provide optimum results in terms of conversion efficiency. As mentioned above, the apex angle $\alpha$ of the axicon is another factor that may be adjusted to improve to the conversion efficiency.

In an alternative embodiment, a fiber-based axicon element is used instead of a bulk optic component. The fiber-based axicon is preferably fused directly to the output endface of the HOM fiber (thus eliminating the need for a magnifying lens in the arrangement) and the output endface of the fiber-based axicon element is processed to create the conical profile. Well-known fabrication techniques may be used to form the conical profile and its defined apex angle to exhibit the apex angle required to achieve maximum conversion efficiency.

In yet another embodiment of the present invention, a section of graded-index (GRIN) fiber may be used as an axicon element. In this case, the section of GRIN fiber is formed to exhibit a relatively linear refractive index profile, where this specific profile transforms an $LP_{0,N}$ mode signal into the desired diffraction-limited form. In this case, there is no need to process the output endface of the GRIN axicon to exhibit a conical form, since the refractive index profile performs the desired transformation function.

In the GRIN-based embodiment, the conventional linear refractive index profile of an axicon can be modified to provide improved matching to the $LP_{0,N}$ output from the HOM fiber, where a polynomial based best-match has been used in an exemplary embodiment.

In an exemplary method of optimizing the performance of an axicon-based mode converter, a test beam (of Gaussian form) is passed through an axicon in the reverse direction (with respect to a propagating amplified signal) and then compared with the higher-order mode signal exiting the HOM fiber amplifier. The degree of overlap between the test beam and HOM beam is determined, and the specific characteristics of the axicon (e.g., apex angle, diffraction length, refractive index profile) modified in an iterative process until a maximum amount of overlap is achieved.

One particular embodiment of the present invention discloses an optical system for providing conversion of a higher-order mode optical signal into a diffraction-limited beam taking the form of an axicon-based mode converter including an axicon lensing element formed to exhibit optical characteristics such that when the higher-order mode optical output signal is applied as an input to the axicon lensing element, the axicon lensing element performs mode conversion in a manner that creates a diffraction-limited output signal.

Another aspect of the present invention comprises a method of optimizing the conversion efficiency of an axicon-based mode converter, the method comprising the steps of: a) defining a mode order N of a higher-order mode optical signal to be converted; b) selecting a nominal set of axicon optical characteristics; c) transmitting a Gaussian test beam in a reverse direction through an axicon having the selected set of optical characteristics; d) comparing the profile of the test beam exiting the axicon to a known profile of the defined mode N; e) determining if there exists a sufficient overlap between the test beam profile and the higher-order mode beam and, if so, defining the optical characteristics as the optimal axicon characteristics, otherwise f) adjusting the values of the axicon optical characteristics and repeating steps c)-e) until an acceptable overlap is achieved.

Other and further aspects and features of the present invention will become apparent during the course of the following discussion and by reference to the accompanying drawings.

BRIEF DESCRIPTION OF THE DRAWINGS

Referring now to the drawings, where like numerals represent like parts in several views.

DETAILED DESCRIPTION

Figure 1:
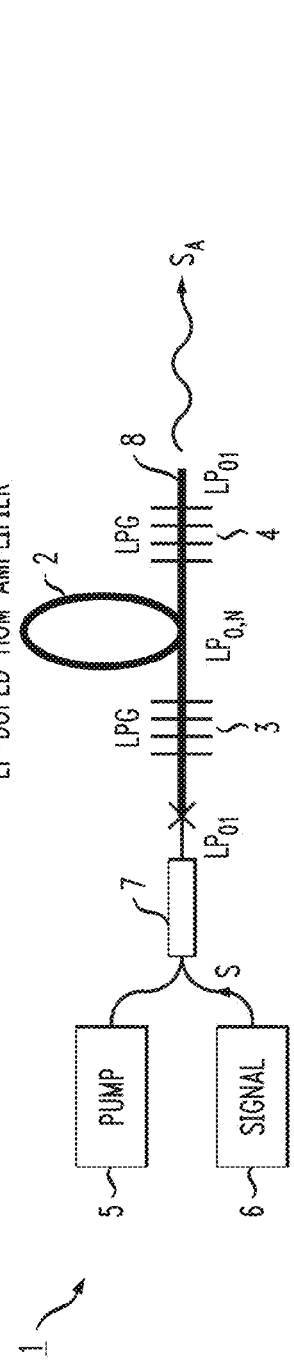
FIG. 1 is a diagram of a portion of a conventional prior art optical amplifier formed of a section of doped HOM fiber.

Prior to describing the various aspects of the present invention in detail, an overview of the operation of a fiber amplifier using a section of higher-order mode (HOM) optical fiber is presented. FIG. 1 illustrates an exemplary prior art HOM-based fiber amplifier 1, which includes a section of doped HOM fiber 2 disposed between an input mode converter 3 and an output mode converter 4. In this example, both mode converters take the form of long period gratings (LPGs) which are formed by modifying the refractive index characteristics of the opposing end portions of HOM fiber 2.

In operation, HOM fiber 2 is formed to include a rare earth dopant (for example, erbium) such that in the presence of light at a predetermined activation wavelength, a propagating optical signal S will experience amplification. In arrangements that utilize erbium as the rare earth dopant, pump light at a wavelength of about 1480 nm (or possibly 980 nm) provides the desired amplification. The pump light may either propagate in the same direction as the optical input signal, or may pass in the opposite direction through amplifying medium since its only purpose is to be "present" within the rare-earth medium and activate the generation of amplification within the optical signal. In the arrangement shown in FIG. 1, a pump source 5 and an optical signal source 6 are positioned to be propagating in the same direction through HOM fiber 2, where both pass through a wavelength division multiplexer 7 and are thereafter coupled into input LPG mode converter 3. The pump light and optical signal S are converted from their fundamental $LP_{01}$ mode into a selected higher-order $LP_{0,N}$ mode as they propagate through input LPG 3. The pump light activates the amplification of optical signal S and an amplified version of the optical signal, denoted $S_A$, thereafter exits HOM fiber 2 in its $LP_{0,N}$ mode. Output LPG mode converter 4 is then used to convert higher-order mode amplified signal $S_A$ back into a fundamental $LP_{01}$ mode form.

As previously discussed, this prior art configuration using LPG-based mode converters as shown in FIG. 1 is acceptable in many situations, but becomes problematic when high power signals are to be amplified. In particular, it has been found that an LPG device exhibits nonlinearities in the form of self-phase modulation in the presence of high power signals. These nonlinearities alter the mode conversion properties of an LPG in an unwanted fashion. At high peak powers (e.g., hundreds of kW to MW), permanent changes in the physical properties of LPGs have been observed. These nonlinear effects thus significantly impact the ability to generate the required diffraction-limited beams (low $M^2$ value) at the output of high peak power HOM amplifiers.

Figure 2:
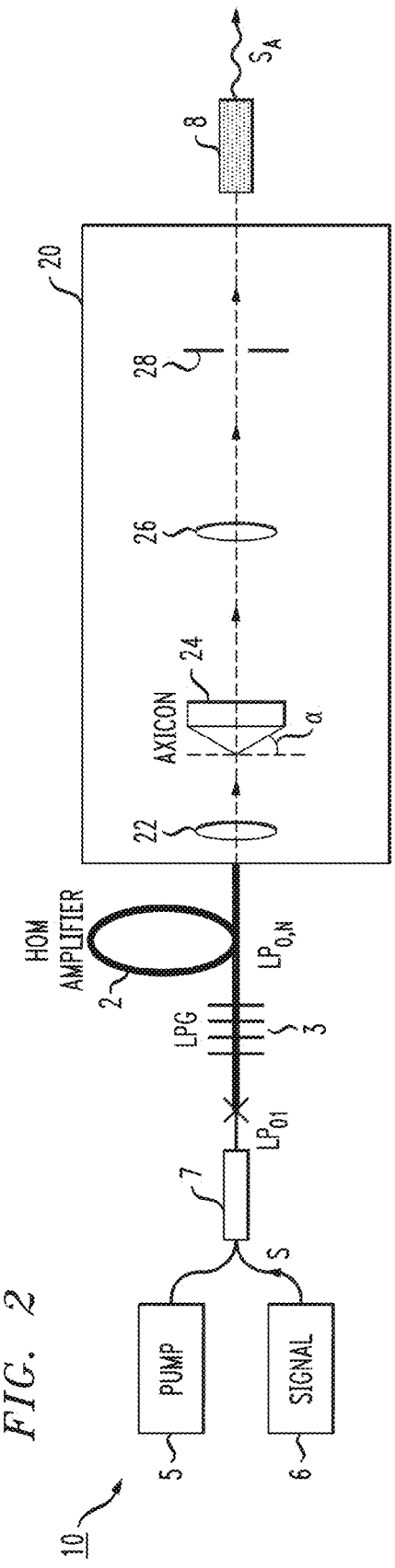
FIG. 2 is a diagram of an exemplary HOM fiber-based optical amplifier formed in accordance with the present invention, including an axicon-based output mode converter that utilizes a bulk optic axicon device.

FIG. 2 illustrates a high power HOM-based fiber amplifier 10 formed in accordance with the present invention that overcomes the limitations of the prior art by eliminating the need to use LPG-based devices to convert the output HOM amplified signal into a beam having a small spatial configuration. Instead, as shown in detail in FIG. 2, an axicon-based converter 20 is used to transform the higher-order mode amplified signal at the output of HOM fiber 2 into a diffraction-limited beam ($M^2$ value as close to 1.0 as possible). As known in the art, an axicon is a specialized type of optical lens which has a conical end surface and is defined by its cone apex angle α. As mentioned above and described in detail below, an axicon-based converter can transform any mode order $LP_{0,N}$ beam into a diffraction-limited beam by appropriately adjusting the magnification and lens spacing of the system.

Referring to FIG. 2, axicon-based mode converter 20 is shown as including a first lens 22 for magnifying the high-power, higher-order mode output from HOM fiber 2. This magnified signal, which retains its higher-order mode form during magnification, then passes through an axicon element 24. In the specific embodiment as shown in FIG. 2, axicon element 24 takes the form of a "bulk optic" axicon (that is, a discrete component). As will be discussed in detail below, the apex angle α of axicon element 24, in combination with the spacings between the various components forming converter 20, is selected to create a diffraction-limited output signal at the exit of converter 20. Axicon-based mode converter 20 is shown as further comprising a focusing lens 26 and an aperture (i.e., spatial filter) 28 to remove any residual high divergence light from the high power amplified output signal $S_A$ exiting axicon element. It is to be understood that the utilization of spatial filter 28 is optional, and there may be instances where the output beam will propagate for long distances and spatial filtering is not required.

Figure 3:
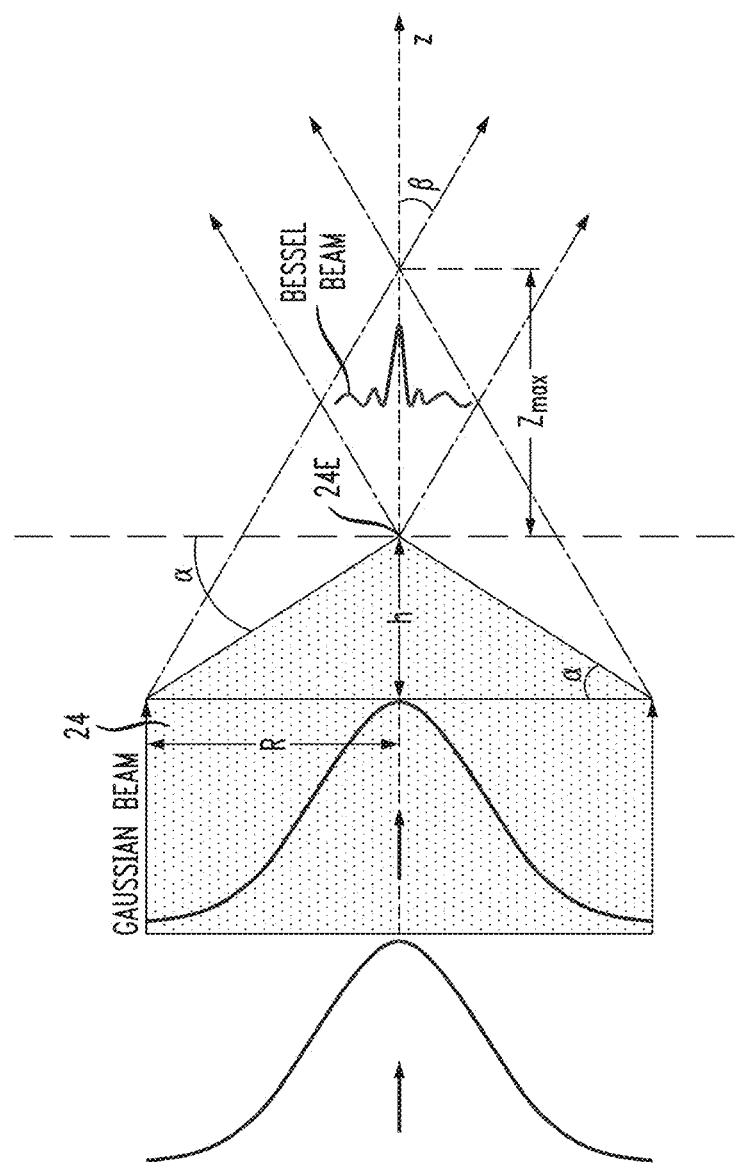
FIG. 3 is a ray tracing diagram of an axicon element, illustrating its use in transforming a Gaussian beam into a zeroth order Bessel function.

FIG. 3 is a ray tracing diagram associated with axicon element 24 as shown in FIG. 2. When a Gaussian beam is incident on axicon element 24, the specific properties of the axicon (including its apex angle α) function to transform this Gaussian beam into a beam that is an approximation of a zeroth order $J_0$ Bessel function.

It cannot be directly presumed that a higher-order mode amplified output signal from HOM fiber 2 will create an acceptable diffraction-limited optical output signal by passing through an arrangement such as axicon-based mode converter 20. The $LP_{0,N}$ modes of an HOM fiber are not, in general, $J_0$ Bessel beams, and their modes can only be solved numerically with a mode-solver together with the refractive index of the fiber itself. Indeed, with reference to the configuration as shown in FIG. 2, the propagation of optical signal S through the system must be calculated numerically to determine the efficiency with which a higher-order fiber mode can be converted to a diffraction-limited beam. The optical system must be carefully optimized in order to maximize the conversion efficiency. It was a discovery by the inventor of this unexpected ability of an axicon to perform in this fashion.

Figure 4:
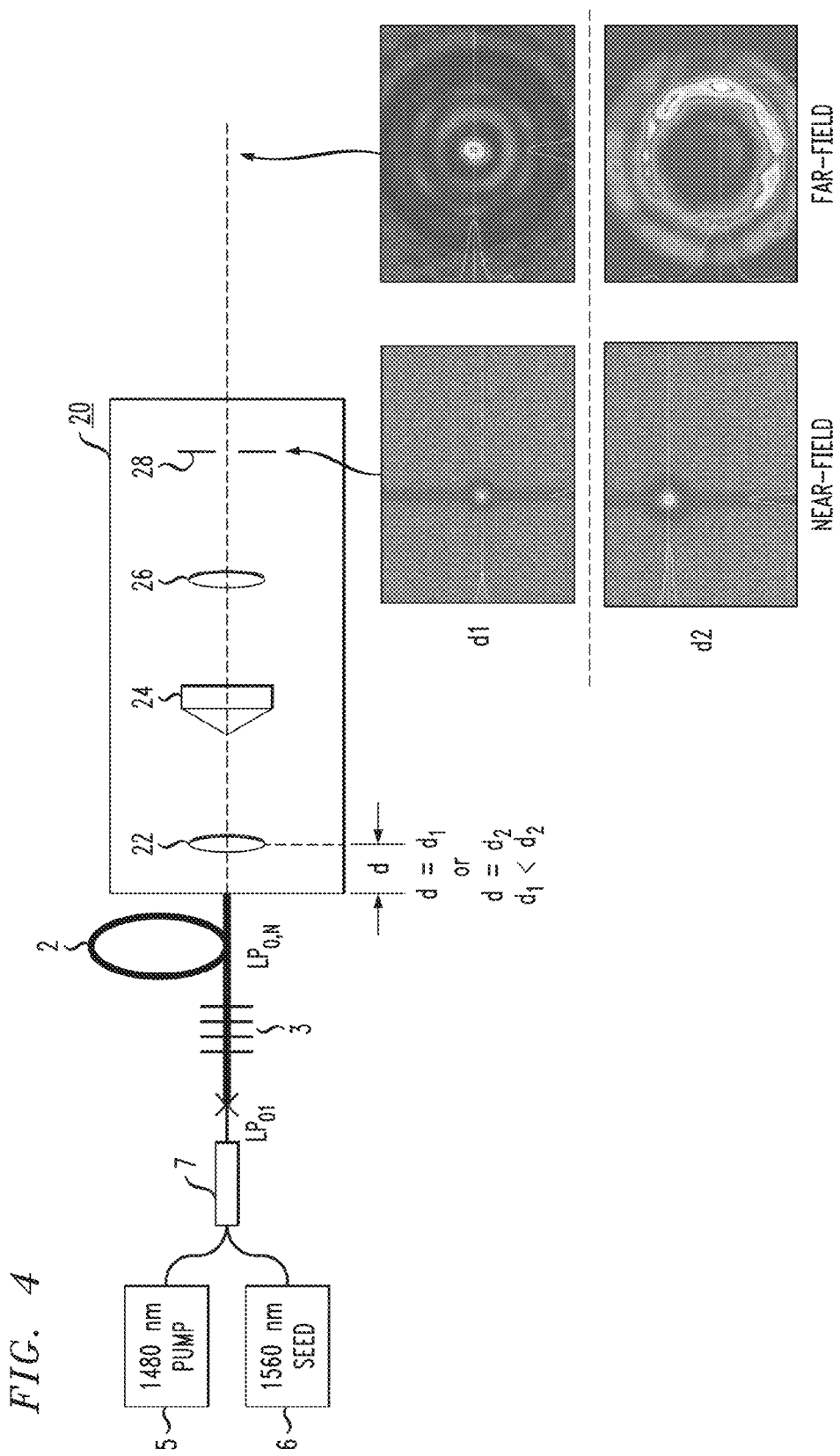
FIG. 4 contains a diagram of the same configuration as shown in FIG. 2, in this case including diagrams of near-field and far-field patterns associated with different magnification spacings.

It has also been found that the quality of the diffraction-limited beam profile at the output of axicon-based mode converter 20 is influenced by the spacing between the endface 2E of HOM fiber 2 and magnifying lens 22 of mode converter 20. FIG. 4 depicts this dependency, illustrating the same component configuration as shown in FIG. 2, and also including the beam profiles (both near-field and far-field) associated with two different spacings between HOM fiber 2 and magnifying lens 22 of converter 20. A first spacing is defined as $d_1$, and a second spacing as $d_2$, where $d_1 < d_2$. Referring to the beam profiles shown in FIG. 4, it is evident that there is little difference in the near-field patterns associated with these two spacings (the near-field patterns being measured at the output of spatial filter 28). However, as the beams continue to propagate beyond the location of spatial filter 28, it is evident that the far-field beam profiles become very different.

As discussed above, given a particular $LP_{0,N}$ higher order mode and axicon apex angle α, the optimal mode conversion requires a certain magnification. Achieving the proper magnification depends at least on having the correct spacing d between endface 2E of HOM fiber 2 and magnifying lens 22. In terms of $M^2$, the mode conversion corresponding to $d=d_2$ has a higher conversion efficiency for a nearly diffraction-limited beam than for the configuration where $d=d_1$.

Figure 5:
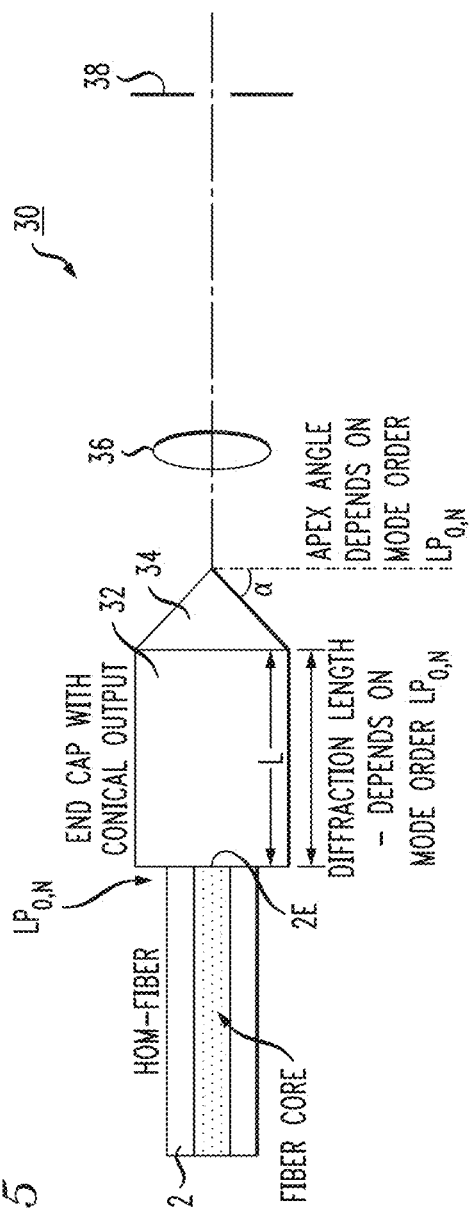
FIG. 5 illustrates an alternative axicon-based mode converter of the present invention, in this case comprising a fiber-based axicon element formed as an endcap that may be directly coupled to the endface of the HOM fiber amplifier.

The embodiment of the present invention as shown in FIGS. 2 and 4 utilizes discrete components in the formation of axicon-based mode converter 20. As mentioned above, it is also possible to create fiber-based axicon mode converters. FIG. 5 illustrates an exemplary fiber-based axicon mode converter 30 that may be used in place of discrete component arrangement 20 in the amplifier of FIG. 2. Converter 30 is shown as comprising an end cap component 32 that may be fusion spliced onto endface 2E of HOM fiber 2. Diffraction takes place along the length L of end cap component 32, where the value of L depends upon the mode order N of the amplified signal $S_A$ at the output of HOM fiber 2. A conical section 34 at the termination of end cap component 32 is formed to exhibit the desired apex angle α required to form a diffraction-limited output beam from the higher-order mode input. Various fabrication processes, well known in the art for processing silicon-based components (for example, polishing or selective etching with an appropriate etchant solution) can be used to form the desired geometry of end cap component 32, including the desired apex angle α for conical section 34.

Inasmuch as the axicon element is directly fused to the endface of the HOM fiber in this configuration, there is no magnification lens included in the structure (such as lens 22 in the embodiment of FIG. 2). Therefore, specifying the operating mode order N fully determines the diffraction length L of end cap component 32, as well as the required apex angle α for conical section 34. The remaining components forming mode converter 30 are similar to those discussed above in association with FIG. 2; namely, a focusing lens 36 and a spatial filter 38 (again, the spatial filtering is optional). In this embodiment, an optimum mode conversion efficiency from the higher-order order mode signal (e.g., $LP_{0,N}$ mode) to a diffraction-limited beam is obtained by modifying the length L of end cap component 32 and apex angle α until an output beam with an $M^2$ value as close as possible to 1 is achieved. If it is desired to provide a degree of magnification, a section of graded-index (GRIN) fiber may be disposed between the output of HOM fiber 2 and end cap component 32. The refractive index profile of a section of GRIN fiber is generally quadratic in form and will, therefore, introduce an amount of magnification to the amplified, higher-order output from HOM fiber 2.

Figure 6:
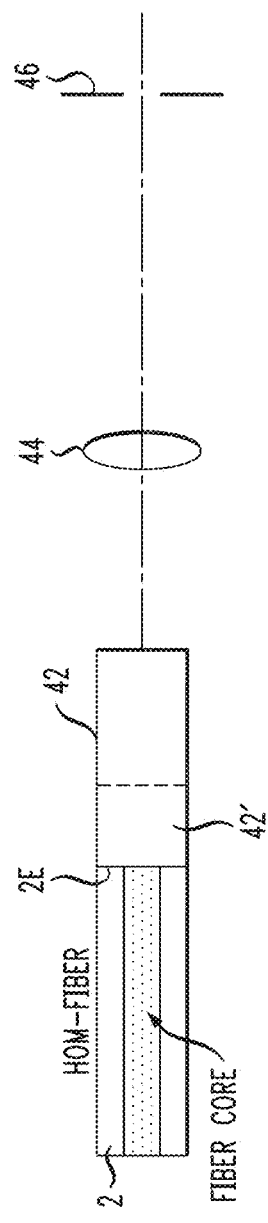
FIG. 6 illustrates yet another embodiment of the present invention, in this case where a section of GRIN fiber is specifically configured, in terms of its refractive index profile, to perform as an axicon that is capable of transforming an $LP_{0,N}$ beam into a diffraction-limited form with a low $M^2$ value.
Figure 7:
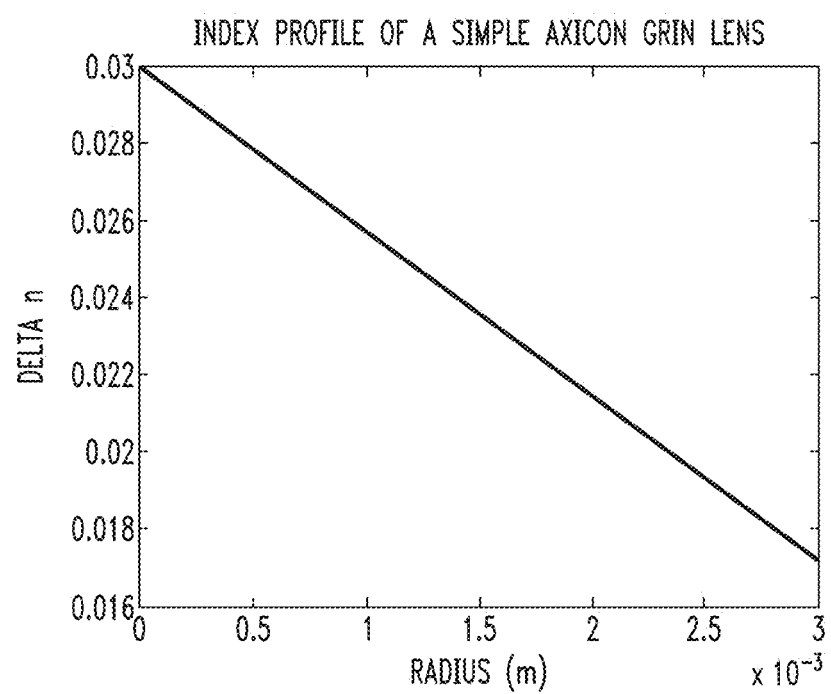
FIG. 7 is a plot of the refractive index profile for an exemplary GRIN-based axicon as shown in FIG. 6, where in this case the GRIN fiber is formed to exhibit a simple linear profile.

Another axicon configuration useful as an integrated output mode converter for an HOM-based fiber amplifier in accordance with the present invention can be created by using a section of graded-index (GRIN) fiber. An exemplary GRIN-based axicon converter 40 is illustrated in FIG. 6. In this configuration, a GRIN-based axicon element 42 is formed from a section of optical fiber with an index of refraction that decreases linearly from the center of the fiber to the outer edge of the core. FIG. 7 illustrates an exemplary refractive index profile for GRIN-based axicon element 42. As with the configuration shown in FIG. 5, GRIN-based axicon element 42 is affixed to endface 2E of HOM fiber 2, with the diffraction-limited signal exiting element 42 thereafter passing through a focusing lens 44 and (optional) spatial filter 46. It is noted that inasmuch as the linear refractive index profile is the parameter that provides the conversion from a higher-order mode signal into a diffraction-limited beam, the utilization of a conical end section is not necessary.

As with the other embodiments, the specific characteristics of the GRIN-based axicon can be adjusted to maximize the conversion efficiency between the higher-order mode input and the diffraction-limited output. In this case, the strictly linear refractive index profile of the section of GRIN fiber is adjusted to be defined as a slightly nonlinear form (for example, characterized as an $m^{th}$ order polynomial, defining both the order m and coefficients of the polynomial).

Additionally, it is possible to modify the refractive index profile of a first portion 42' of axicon element 42 to provide magnification of the output signal from HOM 2. Alternatively, it is possible to utilize two separate sections of GRIN fiber that are fused to endface 2E of HOM fiber 2, with the first performing magnification and the second (having a specially-defined refractive index profile) creating the diffraction-limited output.

Indeed, another aspect of the present invention relates to a method that may be used to optimize the characteristics of an axicon-based mode converter in a manner that provides a maximum conversion efficiency from a higher-order mode amplified beam into a diffraction-limited beam. The method, as will be described below, is a function of the particular "order" N of the created higher-order mode signal. For one exemplary set of experiments, an $LP_{0,14}$ beam was studied. The method itself includes a first process for determining an optimum set of axicon characteristics, and a second process for determining an optimum transmission factor for the associated spatial filter, based on the optimum set of axicon characteristics.

Figure 8:
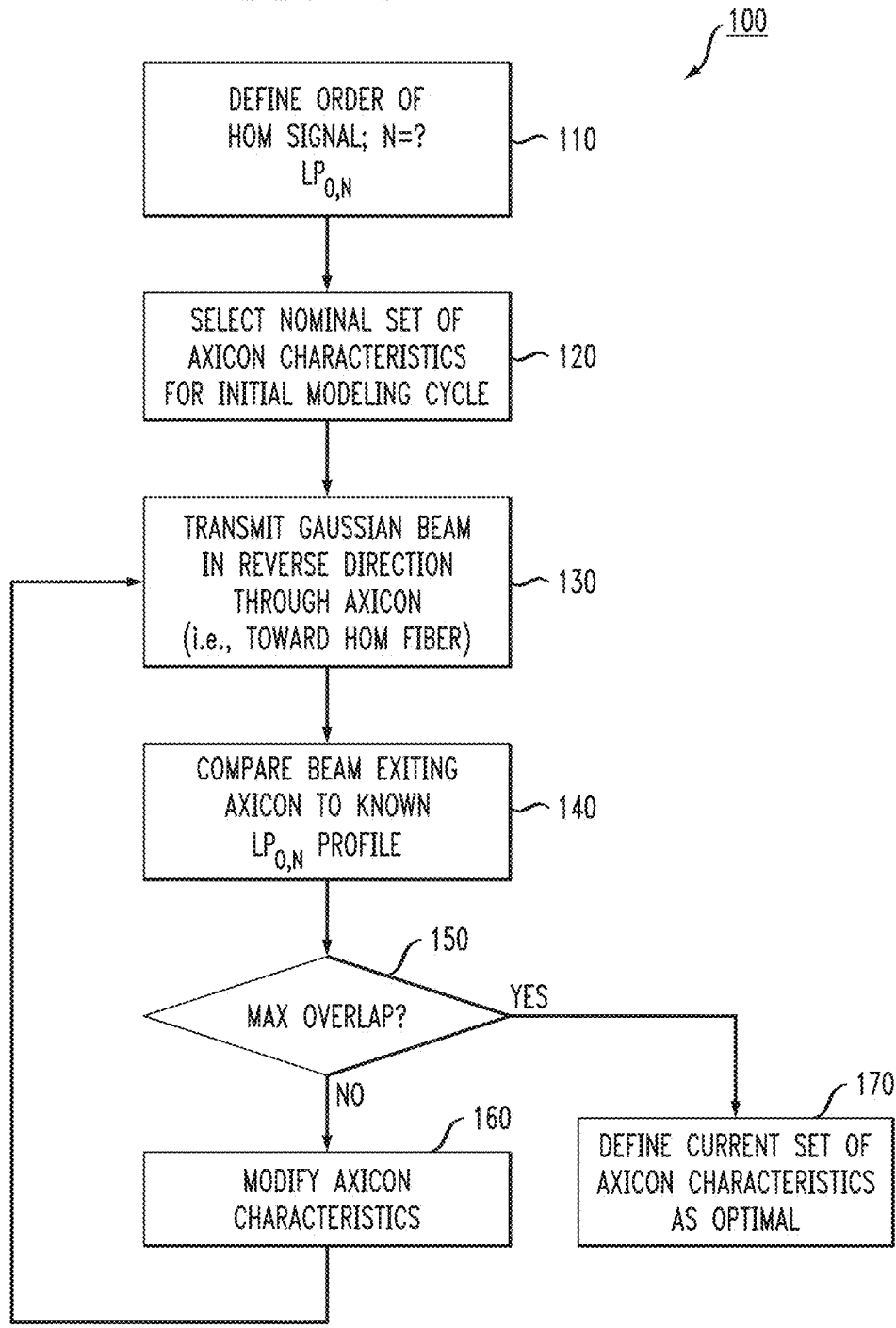
FIG. 8 contains a flowchart of an exemplary process utilized to optimize the optical characteristics of an axicon-based mode converter.
Figure 9:
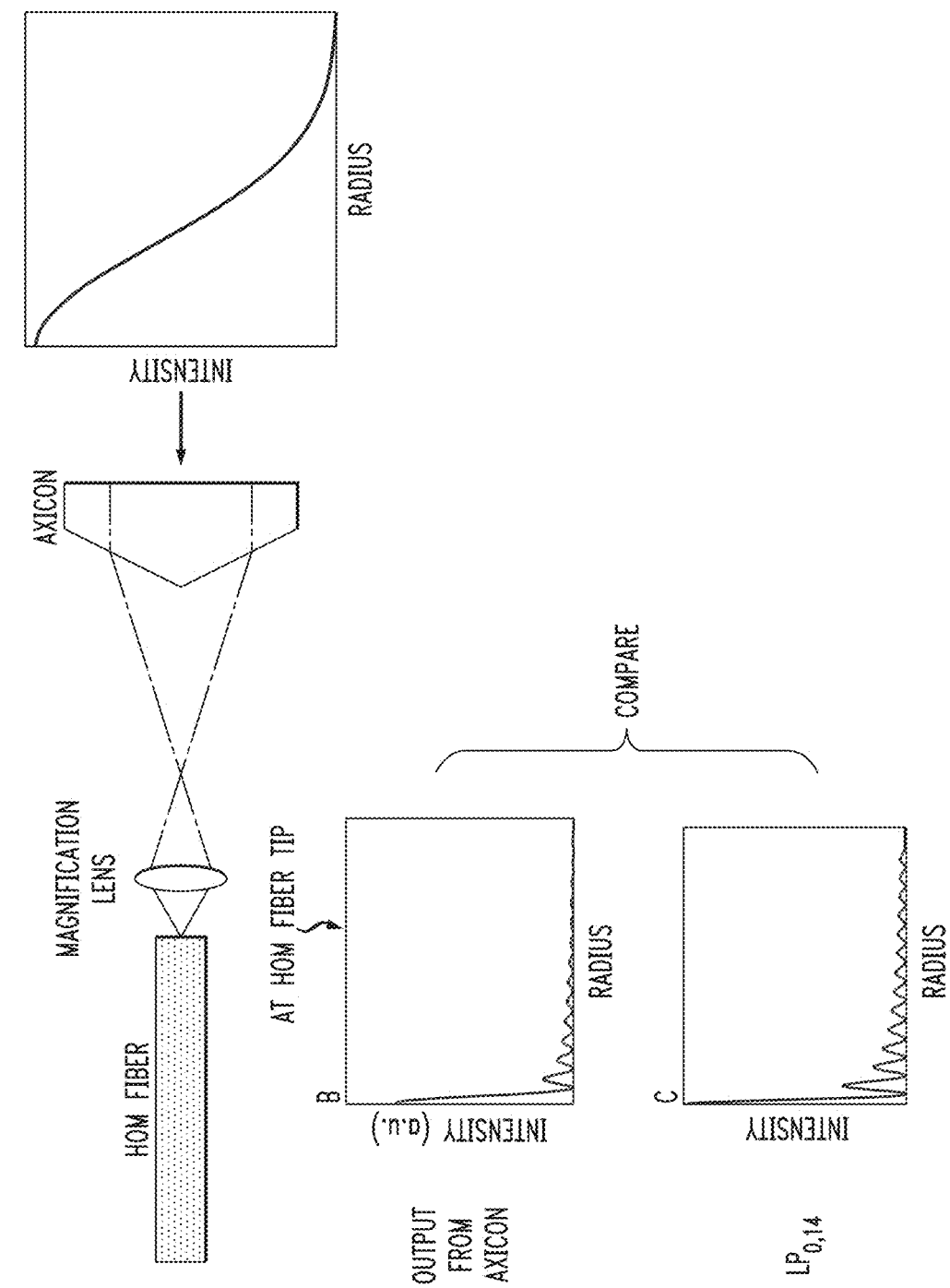
FIG. 9 illustrates a set of components used in conjunction with the flowchart of FIG. 8.

FIG. 8 is a flowchart of one exemplary set of steps associated with this first process; that is, a process 100 for optimizing the optical characteristics of the axicon itself. FIG. 9 is a diagram of the specific components involved in process 100. With reference to FIG. 8, the first step in the process (step 110) is defining the specific order of the HOM signal that needs to be converted into a diffraction-limited form. For the purposes of explanation, a value of N=14 is presumed. Once the order is known, the process continues at step 120 with selecting a "nominal" set of axicon characteristics with which to begin the optimization process. For arrangements using a bulk optic axicon, the characteristics include the apex angle α and desired amount of magnification (the latter defined by the spacing d between the HOM fiber and the magnifying lens); for a fiber-based axicon, the characteristics include its length L and apex angle α; and for the GRIN-based axicon, the characteristics include the order and coefficients of the polynomial used to define its refractive index profile.

Once an initial set of nominal characteristics are selected and an initial axicon is defined, the process continues at step 130 by transmitting a conventional Gaussian beam in the reverse direction through this defined axicon. FIG. 9 illustrates step 130, depicting the introduction of a Gaussian beam (as shown in plot A of FIG. 9) into the "output" of an axicon (output with respect to relative position of a section of HOM fiber and an axicon). As shown in FIG. 9 and discussed above, the passage of a Gaussian beam through an axicon results in the formation of an approximate zeroth order Bessel beam. Plot B in FIG. 9 illustrates an exemplary beam profile as created by passing a Gaussian beam through the initially-configured axicon.

In accordance with the method of the present invention, this beam profile as shown in plot B is then compared to the actual $LP_{0,14}$ mode profile of an amplified beam exiting the section of HOM fiber (the $LP_{0,14}$ beam profile shown in plot C of FIG. 9). The comparison is defined at step 140 in the flowchart of FIG. 8, where in one case the comparison can take the form of determining the overlap between the two plots. A query is then performed, shown as step 150, to determine if a maximum overlap between the two has been achieved (i.e., if the overlap is 100%, then the selected characteristics of the axicon create an exact "match" to the $LP_{0,14}$ profile).

Presuming that the initial overlap percentage is less than 100%, the process continues on to step 160, which modifies the characteristics of the axicon. Once modified, the process returns to step 130, and another pass through the configuration as shown in FIG. 9 is performed. A multiple number of iterations may be necessary, with the process continued until an optimum (or desired) overlap value has been ascertained. It is to be understood that in practice the actual amount of overlap will generally lie within the range of 70%-90%, and will be a function of a number of different parameters (such as the refractive index profile of the HOM fiber and the resulting mode profile), as well as the type of axicon (i.e., bulk, fiber or GRIN) that is utilized.

In the specific case where process 100 is used to obtain to optimize the refractive index profile of a GRIN-based axicon, the "characteristics" to be optimized may include the length of the GRIN-based axicon, as well as the order and coefficients of the polynomial used to define the refractive index profile, as mentioned above. In particular, the refractive index profile is defined at step 120 as having a selected $m^{th}$-order polynomial with a defined set of coefficients. The process continues at step 130 with passing a Gaussian beam through an GRIN-based axicon with this refractive index profile, the process continuing as described in FIG. 8, where the order of the polynomial, as well as its individual coefficients are adjusted to change the shape of the generated Bessel beam output from the axicon.

Figure 10:
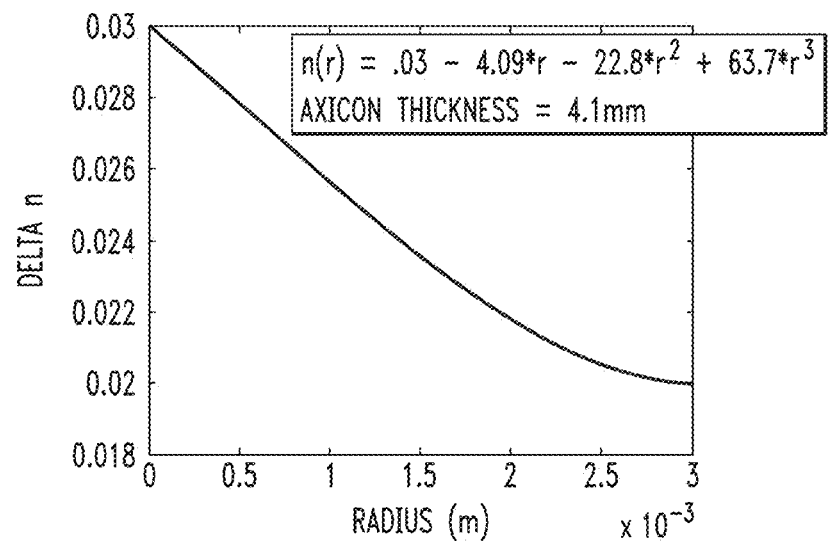
FIG. 10 is a plot of the polynomial-based refractive index profile for a GRIN-based axicon formed using the method outlined in FIG. 8.
Figure 11:
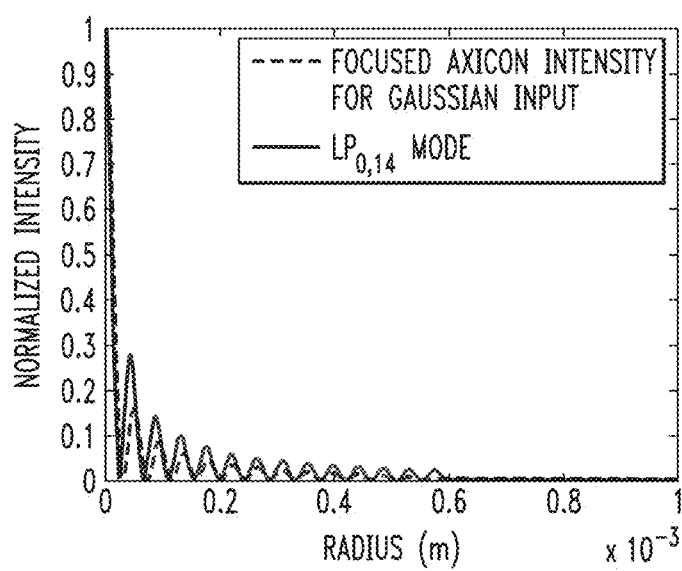
FIG. 11 is a plot illustrate the overlap in profile between the GRIN-based axicon having the refractive index profile shown in FIG. 10 and an $LP_{0,14}$ mode signal.

An exemplary optimized refractive index profile for a modified GRIN-based axicon element created by this method is shown in FIG. 10. In this case, the refractive index profile is shown to take the form of a third-order polynomial. FIG. 11 is a graph showing the comparison between the axicon-generated Bessel function associated with this refractive index profile and the $LP_{0,14}$ output from HOM fiber 2. The overlap between this GRIN-based, axicon-generated beam and the higher-order mode output signal is shown to be about 80%. This is in comparison to an overlap of 75% which is found when using a conventional "linear ramp" axicon (i.e., a device having the refractive index profile shown in FIG. 7). The improvement in overlap illustrates that the GRIN-based axicon can be used to address the non-ideality of HOM 2, such as differences between the guided wave $LP_{0,14}$ and a true Bessel beam, and specific characteristics of HOM fiber 2, such as the presence of the inner core region.

It is to be understood that a combination of different types of GRIN fibers could also be used. Quadratic GRIN lenses (or higher even order terms in the polynomial expansion) could provide magnification (i.e., similar to element 42' mentioned above), followed by primarily odd-ordered GRIN fibers ($1^{st}$, $3^{rd}$, $5^{th}$, etc.) to be used for the actual axicon-based mode conversion. From this it becomes obvious that the potential design space for GRIN fiber-based axicons becomes enormous.

Figure 12:
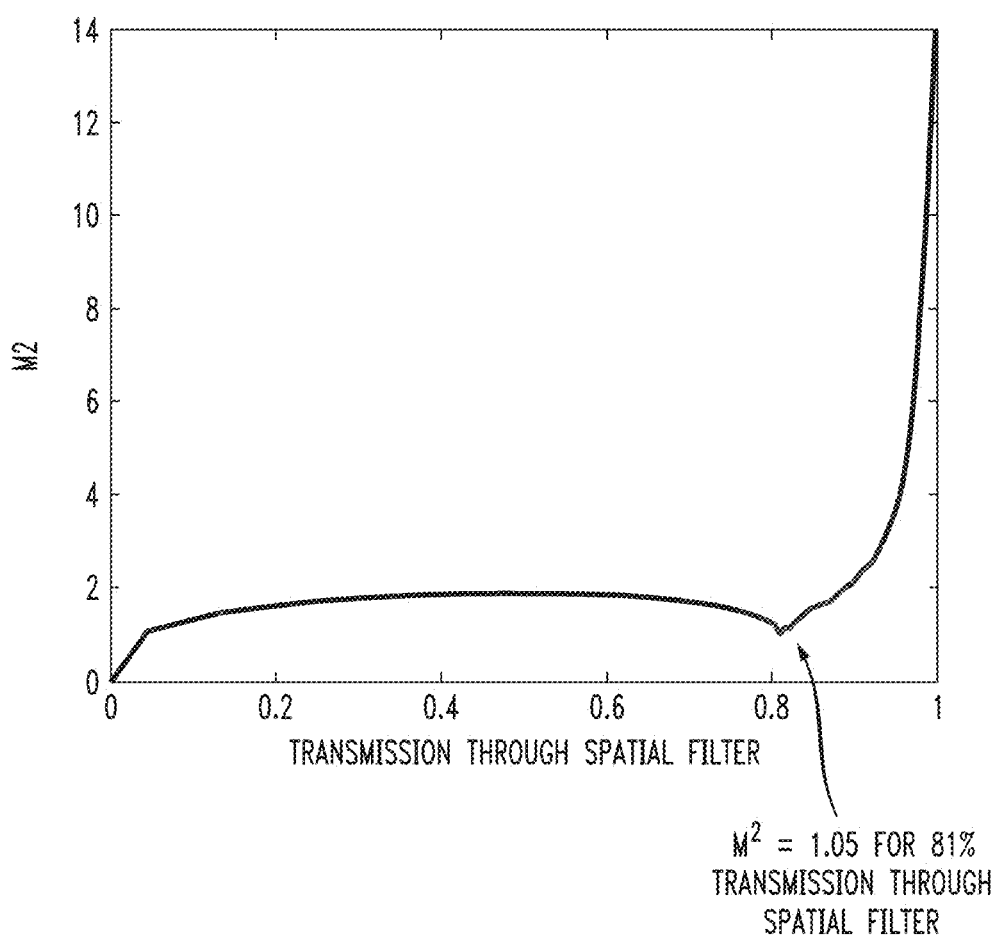
FIG. 12 is a plot of the value of $M^2$ associated with the aperture size of the spatial filter at the output of the axicon-based mode converter.

Once the optimum axicon characteristics have been determined for a specific higher-order mode signal (e.g., $LP_{0,14}$), process of optimizing the $M^2$ value of the axicon-based converter as a function of the transmissivity of the spatial filter may be performed. As known in the art, the $M^2$ value can be thought of as a quality factor for a created beam, as is normally understood as a measure of how tightly a laser beam can be focused under certain conditions (e.g., with limited beam divergence). The best possible beam quality is achieved for a diffraction-limited Gaussian beam, having $M^2=1$. Reference is made to FIG. 12, which is a plot of $M^2$ as a function of aperture size. In this case, "aperture size" is defined as the percentage of optical signal power that is transmitted through the spatial filter at the output of the mode converter (see, for example, spatial filter 28 in converter 20, spatial filter 38 in mode converter 30, and spatial filter 46 in mode converter 40). Thus, a value of 0% transmission means that the entire signal is blocked (i.e., there is no aperture present in the spatial filter), and a transmission value of 50% transmission means that the aperture is sized as to as to allow only the central half of the signal to pass through.

Figure 13:
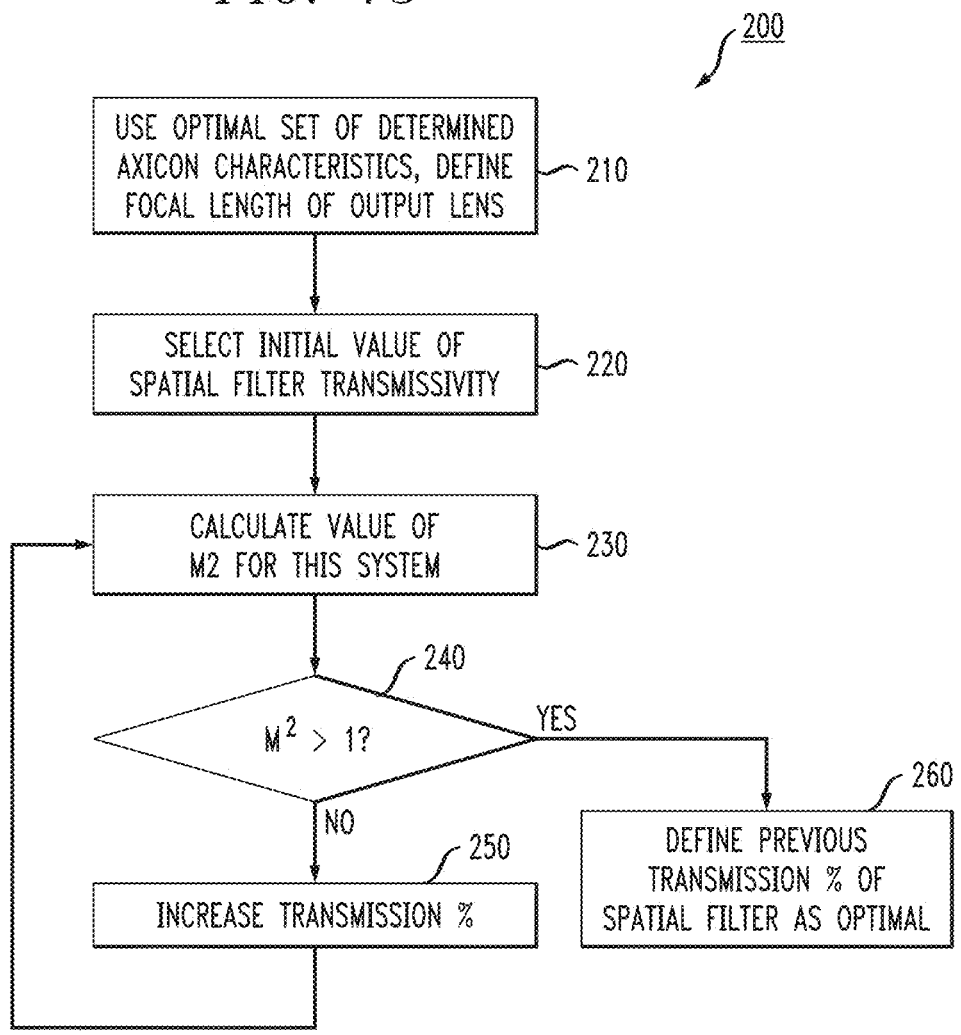
FIG. 13 is a flowchart of an exemplary process that may be used to determine the proper aperture size for creating an $M^2$ value as close to 1 as possible.
Figure 14:
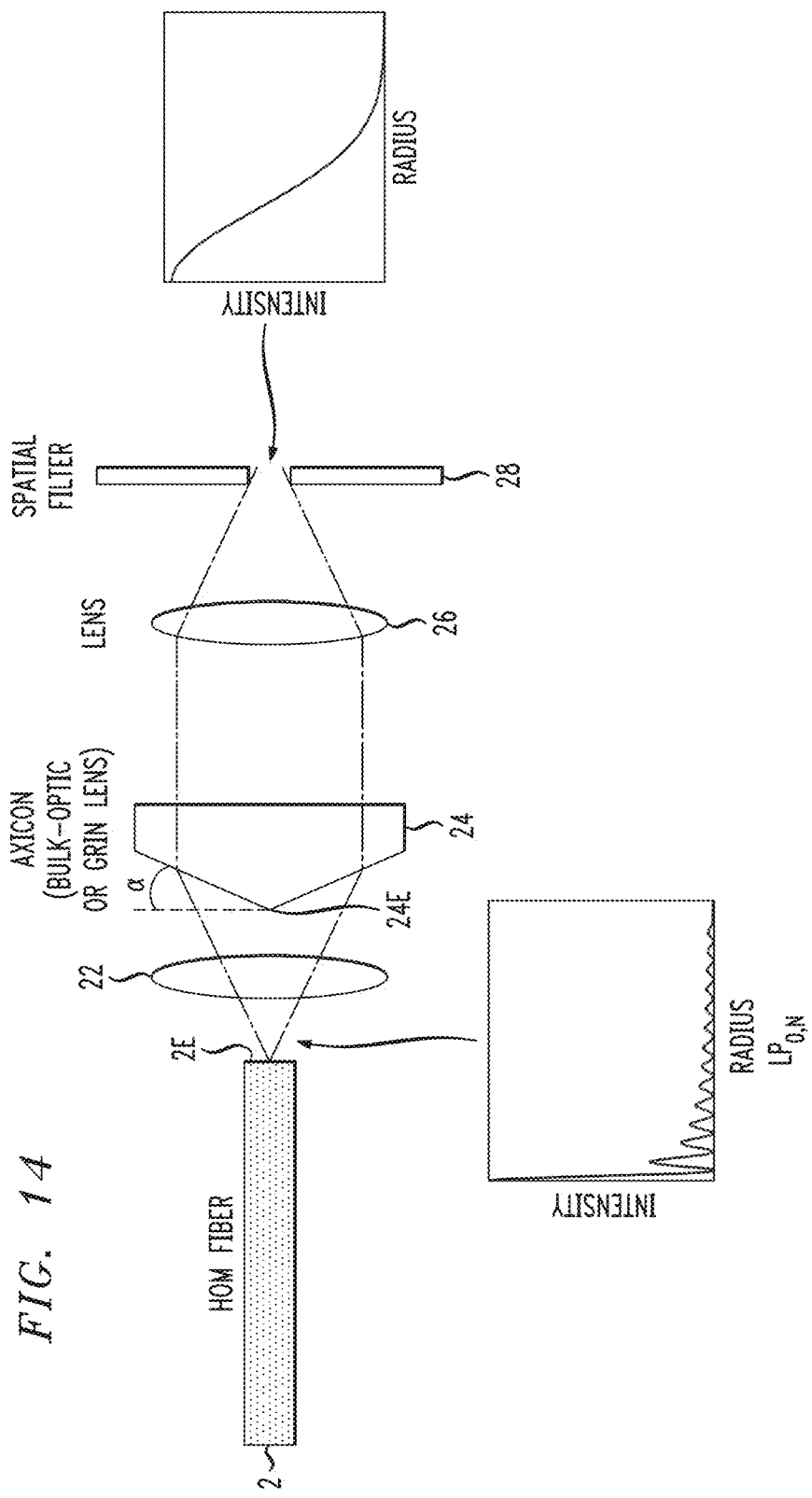
FIG. 14 is a diagram of selected components utilized to perform the process as illustrated in FIG. 13.

FIG. 13 contains an exemplary flowchart for this second process 200, with FIG. 14 containing a set of components that may be used in the performance of this second process. As shown in FIG. 13, the process begins at step 210 by defining the known parameters, including the optimal characteristics for the axicon (as found from process 100), as well as the spacing between the HOM fiber and the magnifying lens (if appropriate), and the focal length of the focusing lens disposed between the axicon and the spatial filter (this configuration shown in FIG. 14).

The next step in the process (step 220) is to select an initial value of aperture size for the spatial filter (aperture size defining the percentage of transmitted power, as described above, presuming that the particular application requires the use of such filtering. Next, the value of $M^2$ associated with this aperture size is calculated (step 230). A decision is then made (step 240) based on the current value of $M^2$, where if it is less than 1 the aperture size is increased (step 250), and the value of $M^2$ is re-calculated for this new value. Returning to step 230, if the calculated value of $M^2$ is found to be greater than unity, this indicates that the optimum value has been exceeded (see FIG. 13), and that the previously-used aperture size is defined as "optimal" value.

FIG. 14 illustrates the far-field patterns for three different values of aperture size, where a value of 90% is shown to provide the best result.

In looking at the particular values of the plot shown in FIG. 13, it is shown that the optimum unity value for $M^2$ is associated with a transmission value of 81%. Spatial filter 28 is then configured so as to pass 81% of the high-power amplified signal (now in the fundamental mode) through the filter and thereafter be coupled into an output singe mode fiber (or other suitable diffraction-limited output device).

Other embodiments of the present invention are contemplated to utilize conical lenses that are particularly configured to handle various other forms of higher-order mode signals, including but not limited to $LP_{1,N}$ mode signals. Indeed, a 2M-sided pointed lens is contemplated as appropriate for use in converting complex $LP_{M,N}$ mode signals into a fundamental $LP_{01}$ form.

What is claimed is:

1. An optical system for providing conversion of a higher-order mode optical signal into a diffraction-limited beam, the optical system comprising:
an optical waveguide for supporting the propagation of a higher-order mode optical signal;
an axicon-based mode converter coupled to the output of the optical waveguide, the axicon-based mode converter including an axicon lensing element and a magnifying element, the magnifying element disposed between the optical waveguide and the axicon lensing element and the axicon lensing element formed to exhibit optical characteristics such that when the higher-order mode optical signal from the optical waveguide is applied as an input to the axicon-based mode converter, the axicon element performs mode conversion in a manner that creates a diffraction-limited output signal.

2. The optical system as defined in claim 1 wherein the axicon element comprises a bulk optic axicon device having a conical endface, the conical endface defined by an apex angle α at the termination therefore and the apex angle α being the optical characteristic selected to provide mode conversion from the higher-order mode beam into the diffraction-limited beam.

3. The optical system as defined in claim 2 wherein the magnifying element comprises a bulk optic magnifying lens disposed at the input of the bulk optic axicon device to provide magnification of the higher-order mode optical signal prior to mode conversion, where the amount of magnification depends on a mode order N and the axicon apex angle α.

4. The optical system as defined in claim 1 wherein the axicon-based mode converter comprises a fiber-based magnifying element including a diffraction section of a predetermined length L and a fiber-based axicon element having a conical end portion exhibiting a predetermined apex angle α, the length L and apex angle α determined as a function of a mode order N.

5. The optical system as defined in claim 4 wherein the fiber-based magnifying element is a separate element disposed at the input of the fiber-based axicon element.

6. The optical system as defined in claim 1 wherein the axicon element comprises a GRIN fiber-based axicon element, wherein the GRIN fiber exhibits a refractive index profile appropriate for converting the higher-order mode signal into a diffraction-limited beam.

7. The optical system as defined in claim 6 wherein the GRIN fiber exhibits an essentially linear refractive index profile, decreasing in value from the center of the fiber outward.

8. The optical system as defined in claim 6 wherein the GRIN fiber exhibits a polynomial-defined refractive index profile, where the order of the polynomial and the coefficient value of each term define the conversion of the higher-order mode beam into a diffraction-limited beam.

9. The optical system as defined in claim 1 wherein the system further comprises an output lens disposed at the output of the axicon element, the output lens utilized to focus the mode-converted output beam.

10. The optical system as defined in claim 9 wherein the system further comprises a spatial filtering element disposed beyond the output lens and utilized to block residual, unconverted high divergence signal components.

11. The optical system as defined in claim 10 wherein the transmission efficiency of the spatial filtering element is configured to provide an optimum $M^2$ value.

12. The optical system as defined in claim 1 wherein the optical waveguide comprises a section of higher-order mode optical fiber.

13. The optical system as defined in claim 1 wherein the optical waveguide is used to support the propagation of an $LP_{0,N}$ signal.

14. An HOM fiber-based optical transmission system, comprising:
a section of doped HOM fiber including an input endface for receiving an optical signal to be amplified and an output endface for emitting the amplified optical signal;
a long-period grating (LPG) coupled to the input endface of the doped HOM fiber for providing mode conversion between input signals propagating in a fundamental mode and a selected higher-order mode of the doped HOM fiber; and
an axicon-based mode converter coupled to the output endface of the doped HOM fiber, the axicon-based mode converter including an axicon lensing element and a magnifying element, the magnifying element disposed at the input to the axicon lensing element and the axicon lensing element formed to exhibit optical characteristics such that the axicon-based mode converter transforms the selected higher-order mode optical signal at the output of the doped HOM fiber into a diffraction-limited output signal.

15. The HOM fiber-based optical transmission system as defined in claim 14 wherein the axicon element of the axicon-based mode converter comprises a bulk optic axicon device having a conical endface, the conical endface defined by an apex angle α at the termination thereof, wherein the apex angle α is determined to provide mode conversion from the higher-order mode beam into the diffraction-limited beam as a function of a mode order N.

16. The HOM fiber-based optical transmission system as defined in claim 15 wherein the magnifying element comprises a bulk optic magnifying lens disposed at the input of the bulk optic axicon device to provide magnification of the higher-order mode optical output signal from the section of doped HOM fiber, where the amount of magnification depends on the mode order N and the axicon apex angle α.

17. The HOM fiber-based optical transmission system as defined in claim 14 wherein the axicon-based mode converter comprises a fiber-based component fusion spliced to the output endface of the doped HOM fiber, the fiber-based component including a magnifying section of a predetermined length L and an axicon element having a conical end portion exhibiting a predetermined apex angle α, the length L and apex angle α determined as a function of a mode order N.

18. The HOM fiber-based optical transmission system as defined in claim 17 wherein the fiber-based magnifying section is disposed at the output endface of the doped HOM fiber.

19. The HOM fiber-based optical transmission system as defined in claim 14 wherein the axicon element of the axicon-based mode converter comprises a GRIN fiber-based axicon element, wherein the GRIN fiber exhibits a refractive index profile appropriate for converting the higher-order mode signal into a diffraction-limited beam and the GRIN fiber-based axicon element is fused to the output endface of the doped HOM fiber.

20. The HOM fiber-based optical transmission system as defined in claim 19 wherein the GRIN fiber exhibits an essentially linear refractive index profile, decreasing in value from the center of the fiber outward.

21. The HOM fiber-based optical transmission system as defined in claim 19 wherein the GRIN fiber exhibits a polynomial-defined refractive index profile, where the order of the polynomial and the coefficient value of each term define the conversion of the higher-order mode beam into a diffraction-limited beam.

22. The HOM fiber-based optical transmission system as defined in claim 14 wherein the axicon-based converter further comprises an output lens disposed at the output of the axicon element, the output lens utilized to focus the mode-converted output beam.

23. The HOM fiber-based optical transmission system as defined in claim 22 wherein the axicon-based converter further comprises a spatial filtering element disposed beyond the output lens and utilized to block residual, unconverted high divergence signal components.

24. The HOM fiber-based optical transmission system as defined in claim 14 where the section of doped HOM fiber is used to support the propagation of an $LP_{0,N}$ beam.

25. The HOM fiber-based optical transmission system as defined in claim 14 where the system is a fiber-based optical amplifier and further comprises
an optical signal source for providing an input optical signal, the input optical signal coupled into the LPG; and
a pump source for providing pump light through the LPG and into the section of doped HOM fiber, the pump light having a wavelength selected to generate amplification of the input optical signal in the presence of the dopant within the HOM fiber.

26. The HOM fiber-based optical transmission system as defined in claim 25 wherein the optical signal source provides an input optical signal having a power exceeding 1 kW.

* * * * *